United States Patent [19] [11] 3,680,962
Hayakawa [45] Aug. 1, 1972

[54] CONTAMINANT DETECTOR COMPRISING MEANS FOR SELECTIVELY APPLYING PRESSURE TO LIQUIFY BUBBLES

[72] Inventor: Osamu Hayakawa, Tokyo, Japan
[73] Assignee: Kabushikikaisha Tokyo Keiki Seizosho (Tokyo Keiki Seiyosho Co., Ltd.), Tokyo, Japan
[22] Filed: Sept. 2, 1970
[21] Appl. No.: 68,913

[30] Foreign Application Priority Data

Sept. 8, 1969 Japan..........................44/84450

[52] U.S. Cl. ...................356/103, 250/218, 356/207
[51] Int. Cl....G01n 21/00, G01n 21/12, G01n 21/26
[58] Field of Search ...............356/207, 103; 250/218

[56] References Cited

UNITED STATES PATENTS 3,518,437  6/1970  Riggs........................250/218 X

Primary Examiner—James W. Lawrence
Assistant Examiner—T. N. Grigsby
Attorney—Hill, Sherman, Meroni, Gross & Simpson

[57] ABSTRACT

An instrument for detecting and/or measuring amount of contaminants contained in a liquid comprises a tube through which a liquid to be measured flows, a light source projecting substantially parallel light into the tube, a photoelectric conversion element for receiving light passed through the liquid the electric property of which is changed in accordance with the intensity of light incident thereon, and an indicator for indicating the amount of the contaminants in the liquid. In this case the photoelectric conversion element is changed in its electric property in accordance with the light intensity and is so connected to the indicator that the variation of the electric property of the photoelectric conversion element correspons to the amount of the contaminants.

2 Claims, 4 Drawing Figures

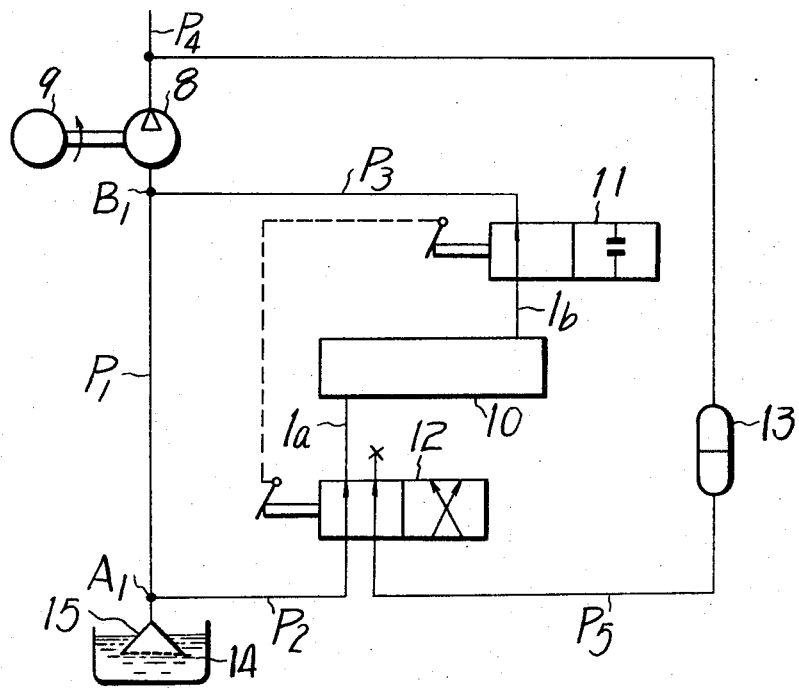
Fig. 2
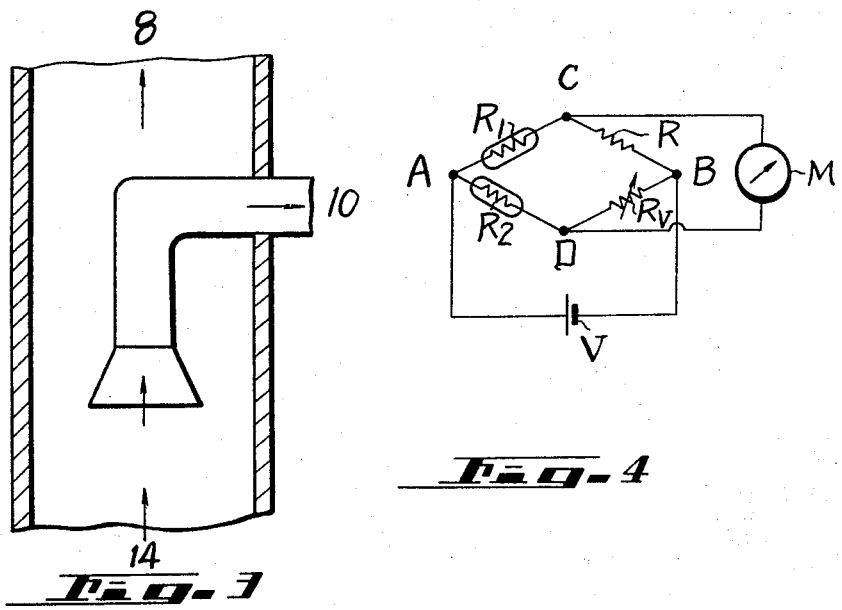
Fig. 3
Fig. 4

CONTAMINANT DETECTOR COMPRISING MEANS FOR SELECTIVELY APPLYING PRESSURE TO LIQUIFY BUBBLES

BACKGROUND OF THE INVENTION

1. Field of the Invention

This invention relates to an instrument for detecting and/or measuring contaminants such, for example, as solid particles and/or bubbles contained in a liquid.

2. Description of the Prior Art

Heretofore, there have been employed many methods for detecting and determining quantitatively dusts such as solid particles, bubbles and the like contained in a liquid such, for example, as oil. One method is to observe an oil to be detected through a microscope, a second method is to observe coloring degree or variation of weight of a membrane filter, a third method is a silting index method, the first to third methods being a so-called sampling method, a fourth method is to employ the scattering characteristics of supersonic waves and light, a fifth method is to utilize the variation of electric property of a liquid to be detected, and so on.

According to the sampling method of the prior art, it takes much time and requires skill in measurement and in addition it can not carry out continuous detection, so that there will appear an experimental error due to observers' skilfulness. While, according to the conventional methods which utilize the scattering characteristics of the supersonic waves and the electric property of the liquid, the continuous detection may be possible, but there is a fear that the apparatus for carrying out the methods become complicated in construction, high at price and out of order frequently.

Further, it is impossible according to any of the conventional methods to measure the amount of solid particles and the amount of bubbles contained in a liquid to be measured individually.

SUMMARY OF THE INVENTION

It is an object of the present invention to provide an instrument for detecting and measuring contaminants such, for example, as solid particles and/or bubbles contained in a liquid to be measured which instrument is free from the drawbacks encountered in the prior art.

It is another object of the present invention to provide an instrument for detecting and measuring contaminants and amount thereof contained in a liquid which instrument can easily and rapidly carry out continuous detection of the contaminants and also measurement of the solid particles and bubbles in the contaminant separately by utilizing the so-called Henry's Law according to which bubbles contained in a liquid may be liquefied by applying pressure to the liquid.

Other objects, features and advantages of the present invention will be apparent from the following description taken in conjunction with the accompanying drawings.

BRIEF DESCRIPTION OF THE DRAWINGS

FIG. 2 is a schematic diagram showing how to employ the instrument of the present in practice;

FIG. 3 is an enlarged cross sectional view showing the part A in FIG. 2; and

FIG. 4 is a connection diagram illustrating the electric circuitry of the instrument according to the present invention.

DESCRIPTION OF THE PREFERRED EMBODIMENT

Figure 1:
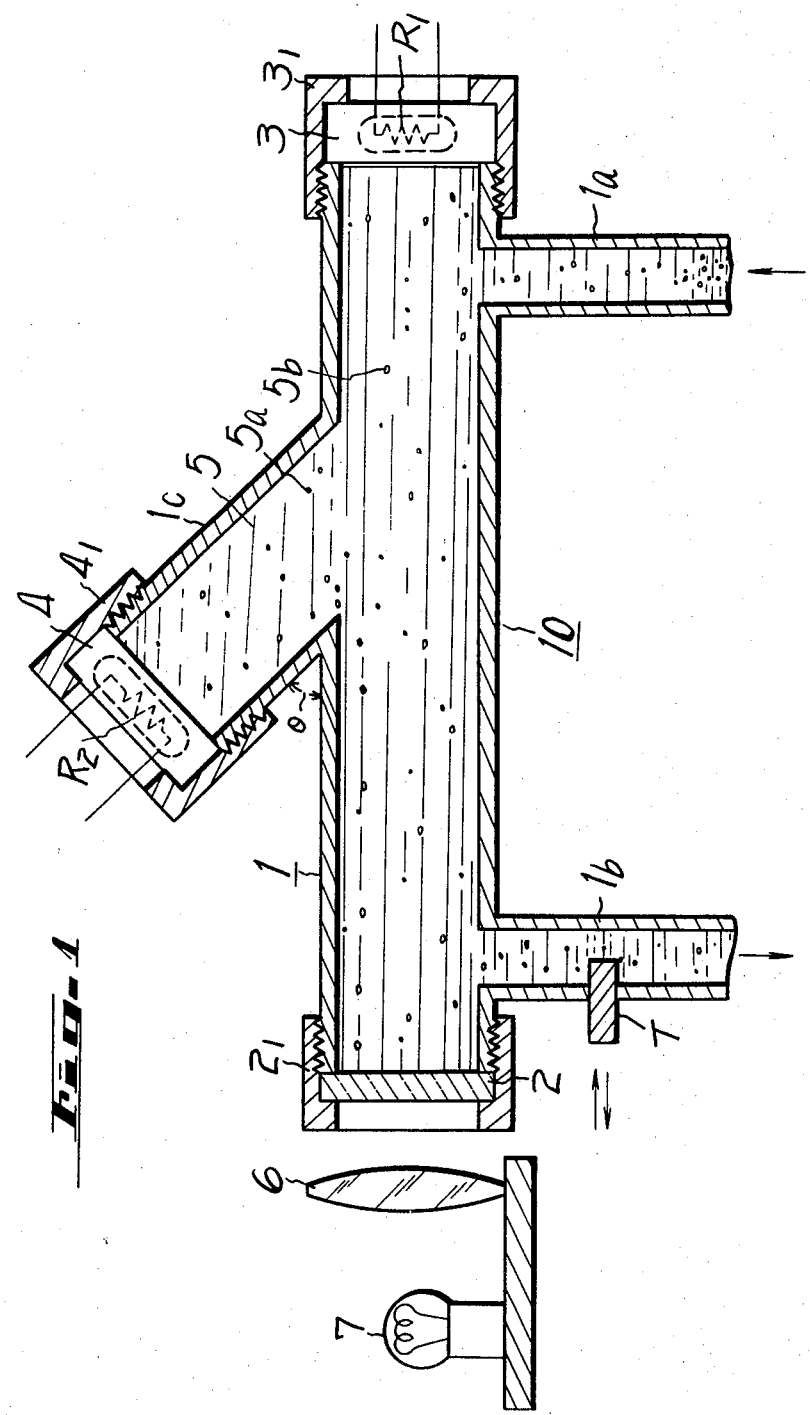
FIG. 1 is a cross sectional diagram showing the main part of one example of an instrument for measuring contaminants contained in a liquid to be measured according to the present invention.

One embodiment of the present invention will be hereinbelow explained in connection with the drawings.

In FIG. 1 reference numeral 1 indicates an instrument proper which is made of, for example, stainless steel and formed to be, for example, a tube or conduit with high pressure resistance and corrosion resistance. The tube 1 has provided integrally therewith an inlet pipe $1_a$ made of, for example, the same material to the tube 1 through which a liquid 5 to be measured is introduced into the tube 1 and an outlet or exhaust pipe $1_b$ made of, for example, the same material to the tube 1 through which the liquid 5 is led out therefrom. The exhaust pipe $1_b$ has provided with a throttle T which can be used for applying pressure to the liquid 5 introduced into the tube 1. The tube 1 has further provided integrally therewith a branch tube $1_c$. Reference numeral 2 designates a transparent plate made of, for example, glass which is fixed to the tube 1 at its one opening in liquid tight manner by means of, for example, a tubular screw $2_1$ and 3 a first photoconductive cell or photoelectric conversion element such, for example, CdS or the like which is fixed to the tube 1 at the other end thereof by means of, for example, a tubular screw $3_1$. The electric resistance value of the photoconductive cell 3 is changed in accordance with the intensity of light incident on the photoconductive cell 3 as well known. Reference numeral 4 represents a second photoconductive cell or photoelectric conversion element which is fixed to the branch tube $1_c$ at its open end in a liquid-tight manner by means of, for example, a tubular screw $4_1$. In this case it will be apparent that all the members forming the instrument are assembled in such a manner that the instrument stands against comparatively high pressure. Reference numerals 6 and 7 designate a lens and a light source and they are arranged in such a manner that the light emitted from the light source 7 is converged by the convergent lens 6 to be substantially parallel light and then led to the photoconductive cell 3 through the transparent glass plate 2 and the liquid 5 which is introduced into the tube 1 from the inlet pipe $1a$ and exhausted to the outside of the tube 1 through the exhaust pipe $1_b$. In this case the branch tube $1_c$ is so attached to or formed on the tube 1 that the light radiated from the light source 7 and led to the photoconductive cell 3 through the lens 6 and the liquid 5 in the tube 1 does not reach the second photoconductive cell 4 when there is no liquid and/or the liquid 5 contains no contaminants such as dusts or solid particles, bubbles and/or the like. In the example illustrated in FIG. 1 although the angle $\theta$ between the longitudinal axes of the tube 1 and the branch tube $1_c$ is selected smaller than 90° with respect to the longitudinal axis of the tube 1, it can be selected to be any angle with the same result.

The operation of the instrument of the present invention will be hereinafter explained. In the event that when the liquid 5 introduced into the tube 1 has contained therein contaminants such, for example, solid particles $5_a$ and bubbles $5_b$ or any one of them, the light radiated from the light source 7 and led to the tube 1 through the convergence lens 6 as parallel light is scattered and/or absorbed by the contaminants, the amount of the light arrived at the first photoconductive cell 3 is decreased as compared with the event that the liquid 5 in the tube 1 has contained no contaminants, which will mean that the resistance value of the photoconductive cell 3 is greater than that when there are contained no contaminants in the liquid 5. While, the scattered light by the contaminants in the vicinity of the coupling area of the tube 1 and the branch tube $1_c$ is led to the second photoconductive cell 4 to decrease its resistance value. In the present invention, the first and second photoconductive cells 3 and 4 are connected in a bridge circuit Br (refer to FIG. 4), so that the variation of the resistance values of the photoconductive cells 3 and 4 are enhanced with each other. Accordingly, slight variation of the amount of the contaminants, which is converted into the variation of the light intensity reached to the photoconductive cells 3 and 4, can be positively detected and measured by the present invention.

FIG. 4 shows one example of the bridge circuit Br. In the figure reference character $R_1$ represents the first photoconductive cell 3, $R_2$ the second photoconductive cell 4, R a fixed resistor with a suitable resistance value, $R_V$ a variable resistor, V a DC electric power source with an adequate voltage and M a voltmeter. Reference characters A, B, C and D indicate connection points among the resistors $R_1$, $R_2$, R and $R_V$. That is, in this example the point A is the connection point between the resistors $R_1$ and $R_2$ (photoconductive cells 3 and 4), the point B the connection point between the fixed resistor R and the variable resistor $R_V$, the point C the connection point between the resistors $R_1$ and R, and the point D the connection point between the resistors $R_2$ and $R_V$. The DC electric power source V is connected between the connection points A and B and the voltmeter M between the connection points C and D.

With the bridge circuit Br if the voltmeter M is adjusted to be zero by means of the variable resistor $R_V$ when the liquid 5 to be measured is introduced into the tube 1, the indication of the voltmeter M, when the liquid 5 to be measured is newly introduced into the tube 1, is the difference between the amount of the contaminants contained in the first liquid and that of the contaminants contained in the liquid introduced into the tube next.

The description will be given how to individually measure the solid particles $5a$ or the bubbles $5b$ of the contaminants contained in the liquid 5. The amount of the contaminants including the solid particles and bubbles contained in the liquid 5 is measured. Then, a suitable pressure is applied to the same liquid 5 in the tube 1 by adequately adjusting the throttle T provided in the exhaust pipe $1_b$ to liquefy the bubbles $5b$ contained in to the liquid 5 in accordance with Henry's Law. The indication of the voltmeter at this time corresponds to the amount of the solid particle $5a$ of the contaminants contained in the liquid 5 only. Accordingly, the amount of the bubbles $5_b$ of the contaminants contained in the liquid 5 can be obtained by subtracting the latter value from the former value.

In connection with FIG. 2 the description will be given how to measure the amount of contaminants contained in a liquid introduced to the suction pipe of an oil pump with the instrument of the present invention. In the figure reference numeral 8 indicates an oil pump, 9 an electric motor for driving the oil pump 8 which sucks up oil from an oil tank 14 through a oil passage or pipe $P_1$, 10 the instrument of the present invention explained above the inlet pipe $1_a$ of which is connected to the pipe $P_1$ at a point $A_1$ through a four-way direction valve 12 and an oil passage or pipe $P_2$. The exhaust pipe $1_b$ of the instrument 10 in turn, is connected to the pipe $P_1$ at a point $B_1$ through an on-off change-over valve 11 and an oil passage or pipe $P_3$. In this case the on-off change-over valve 11 and the four-way valve 12 are manually coupled with each other in such a manner that the change-over valve 11 is changed-over slightly prior to the change-over of the four-way valve 12. Reference numeral 13 designates a pressure transmitting member consisting of a membrane which transmits pressure but does not permit therethrough passage of liquid. The member 13 is provided on an oil passage or pipe $P_5$ which connects another inflow port of the four-way valve 12 with an exhaust pipe $P_4$ of the oil pump 8. Reference numeral 15 indicates a strainer for filtering the oil.

FIG. 3 is a diagram showing the part in the vicinity of the point $A_1$ in enlarged scale. As apparent from FIG. 3 the bubbles contained in the pipe $P_1$ is positively sucked into the pipe $P_2$ and supplied to the instrument 10.

If the on-off change-over valve 11 and the four-way valve 12 are in the condition shown in FIG. 2, the oil in the tank 14 is sucked up through the strainer 15 and one part of the sucked oil is led directly to the oil pump 8 through the pipe $P_1$ and the other part of the oil is led to the instrument 10 through the pipe $P_2$ and the four-way valve 12. Then the latter oil joins the former oil at the point $B_1$ on the pipe $P_1$ through the change-over valve 11 and the pipe $P_3$ and is flowed into the oil pump 8. In this condition the pressure of the oil on the upper stream with respect to the oil pump 8 is low or normal pressure, so that the bubbles contained in the oil arrive at the inlet port of the oil pump 8 without being liquefied. Following to this, when the on-off change-over valve 11 and four-way valve 12 are changed-over the oil flowing through the instrument 10, namely the tube 1 is stopped and the pressure of the oil pump 8 on the exhaust port side thereof is transmitted to the instrument 10 through the member 13 to thereby increase the pressure of the oil in the instrument 10. As a result of this, the bubbles contained in the oil of the instrument 10 under normal pressure are liquefied due to Henry's Law. The amount of the contaminants, namely the amount of the solid particle and the amount of the bubbles contained in the oil on the suction side of the oil pump can be easily detected and measured by the indications of the voltmeter M before and after the on-off change-over valve 11 and the four-way valve 12 are changed-over.

According to the present invention, the amount of contaminants or mixtures in a liquid can be continuously measured without sampling any liquid even if the liquid is under operating condition and further the amounts of the bubbles and the solid particles of the contaminants are individually measured, which is not attained by the prior art device.

It will be apparent that many modifications and variations may be effected without departing from the novel concepts of the present invention.

I claim as my invention:

1. An instrument for detecting and/or measuring the amount of contaminants contained in a liquid comprising a tube means, an inlet pipe means connected to said tube means for introducing a liquid to be analyzed into said tube means, a photoelectric conversion element aligned with said tube means, means for passing light through the liquid within said tube means and toward said photoelectric conversion element, said photoelectric conversion element having the property of varying an electrical property in accordance with the intensity of light incident thereon and in accordance with the amount of contaminants contained in said liquid, an exhaust pipe means connected to said tube means for discharging liquid therefrom, an adjustable throttle means for selectively applying pressure to said liquid to liquefy bubbles contained in said liquid, and detector means for detecting variation in said electric property of said photoelectric conversion element and indicating the amount of said contaminants contained in said liquid.

2. An instrument as claimed in claim 1, which includes a branch pipe means connected to said tube means such that the intersecting angle of the longitudinal axes of the tube means and the branch tube means is less than 90° with respect to the direction of light passing through said tube means, a second photoelectric conversion element located in said branch pipe means and receiving light scattered by the contaminants contained in said liquid to change an electrical property thereof in accordance with the intensity of the light incident thereon, both of said photoelectric conversion elements being connected to said detector means to indicate the amount of contaminants contained in said liquid to be measured.

* * * * *